United States Patent
Hui et al.

(10) Patent No.: US 7,979,076 B2
(45) Date of Patent: Jul. 12, 2011

(54) METHOD OF MANAGING RESOURCES IN A COGNITIVE RADIO COMMUNICATION SYSTEM

(75) Inventors: Junhong Hui, Yongin-si (KR); Duck-Dong Hwang, Yongin-si (KR); Jae-Myeong Kim, Seoul (KR); Sang-Jo Yoo, Incheon (KR); Kwon-Moon No, Seoul (KR); Jae-Hak Chung, Seoul (KR)

(73) Assignees: Samsung Electronics Co., Ltd. (KR); Inha-Industry Partnership Institute (KR)

( * ) Notice: Subject to any disclaimer, the term of this patent is extended or adjusted under 35 U.S.C. 154(b) by 336 days.

(21) Appl. No.: 11/593,301

(22) Filed: Nov. 6, 2006

(65) Prior Publication Data

US 2007/0117537 A1    May 24, 2007

(30) Foreign Application Priority Data

Nov. 4, 2005   (KR) ........................ 10-2005-0105278

(51) Int. Cl.
*H04W 74/00* (2009.01)
*H04W 24/00* (2009.01)
*H04W 4/00* (2009.01)
*H04M 3/00* (2006.01)
*H04B 7/00* (2006.01)
*H04L 5/22* (2006.01)

(52) U.S. Cl. ........ 455/450; 455/425; 455/418; 455/457; 455/509; 455/422.1; 370/330

(58) Field of Classification Search .................. 455/425, 455/418, 450, 457, 509, 422.1; 370/330
See application file for complete search history.

(56) References Cited

U.S. PATENT DOCUMENTS

2004/0157613 A1    8/2004   Steer et al.

OTHER PUBLICATIONS

Mitola III, Joseph, "Cognitive Radio of Flexible Mobile Multimedia Communications", 2001, Kluwer Academic Publishers/ Mobile Networks and Applications 6,435-441, 2001.*
Mitola III, Joseph; Cognitive Radio for flexible mobile multimedia communications; Mobile networks and applications 6,435-441, 2001; Kluwer Academic Publishers.*
Brodersen et al. 2004; CORVUS—A Cognitive Radio Approach for usage of unlicensed spectrum, a pdf document available in Google scholar search downloaded from http://citeseerx.ist.psu.edu/viewdoc/download?doi=10.1.1.67.8142&rep=rep1&type=pdf.*

* cited by examiner

*Primary Examiner* — Kent Chang
*Assistant Examiner* — Manpreet S Matharu
(74) *Attorney, Agent, or Firm* — NSIP Law (57) ABSTRACT

A resource management method in a Cognitive Radio communication system where at least two Base Stations of heterogeneous networks provide a connection service to Mobile Stations within their service areas is provided. In the method, at least one BS having candidate resources broadcasts its candidate resource information on the downlink of a system information channel. At least one BS lacking in resources searches the downlinks of system information channels from neighbor heterogeneous networks, selects an offer BS among the BSs having candidate resources, and rents resources from the selected offer BS by negotiations.

17 Claims, 11 Drawing Sheets

METHOD OF MANAGING RESOURCES IN A COGNITIVE RADIO COMMUNICATION SYSTEM

PRIORITY

This application claims priority under 35 U.S.C. §119 to an application entitled "Method of Managing Resources in a Cognitive Radio Communication System" filed in the Korean Intellectual Property Office on Nov. 4, 2005 and assigned Serial No. 2005-105278, the contents of which are incorporated herein by reference.

BACKGROUND OF THE INVENTION

1. Field of the Invention

The present invention relates generally to a Cognitive Radio (CR) communication system, and in particular, to a method of renting resources and a system supporting the same for a CR communication system.

2. Description of the Related Art

The rapid development of wireless communication systems and the emergence of various wireless services are a driving force behind the ever-increasing demands for radio resources. However, radio resources are considered as a public asset and are placed under strict government regulations. Due to multiple applications on most of the available frequency bands, it is highly difficult to allocate a frequency band to a new wireless communication system.

CR has been proposed as a solution to this problem. CR senses a licensed but unused frequency band and efficiently shares the frequency band.

CR is based on a point-to-multipoint communications. Hence, a Base Station (BS, hereinafter CR BS) manages radio resources in a CR communication system such that as many Mobile Stations (MSs) as possible can efficiently communicate.

A study reported that wireless communication systems have low frequency utilization in practice. In this context, the CR technology has been introduced to increase frequency utilization and facilitate deployment of a new wireless communication system. The Institute of Electrical and Electronics Engineers (IEEE) 802.22 working group has developed a standard for Wireless Regional Area Network (WRAN) by introducing the CR technology to a Television (TV) frequency band and thus sharing an unused TV band for wireless data communications, seeking to increase frequency utilization and expand wireless Internet service.

CR is a promising technology for managing multiple radio channels and detecting interference, in complementary interworking with future-generation wireless communications. For example, CR enables effective high-speed data transmission without causing frequency interference in a shadowing area existing under a cellular environment or in suburban areas requiring increased cell sizes.

Yet, there are many considerations in applying CR to actual wireless communication systems. Since CR is in the early stages of development, configuration techniques have yet to be specified, and the development of an efficient resource allocation scheme has been problematic.

For CR implementation as described above, there is a need for a method of dynamically renting unused resources from licensed systems without causing interference to radio communications of the licensed systems.

SUMMARY OF THE INVENTION

An object of the present invention is to substantially solve at least the above problems and/or disadvantages and to provide at least the advantages below. Accordingly, the present invention provides an efficient resource management method and a system supporting the same for a CR communication system.

The present invention provides a method of renting radio resources between CR BSs and a system supporting the same in a CR environment.

The present invention provides a dynamic resource renting protocol of a Medium Access Control (MAC) layer to provide the functionality of renting radio resources between CR BSs in a CR environment.

The present invention provides a method of enabling a CR BS lacking in radio resources to rent radio resources from another CR BS in a CR environment and a system supporting the same.

According to the present invention, in a method of renting resources in a CR wireless communication system, a renter BS receives a resource advertisement message broadcast from at least one neighbor BS. The renter BS sends a resource renting request message to an offer BS being one of the at least one neighbor BS based on channel set information included in the resource advertisement message and receives a response message for the resource renting request message from the offer BS.

According to the present invention, in a method of renting resources in a CR wireless communication system, an offer BS broadcasts a resource advertisement message including channel set information to at least one neighbor BS. The offer BS receives a resource renting request message from a renter BS being one of the at least one neighbor BS and sends a response message for the resource renting request message to the renter BS.

According to the present invention, in a method of renting resources in a CR wireless communication system, an offer BS broadcasts a resource advertisement message including channel set information to at least one neighbor BS. A renter BS being one of the at least one neighbor BS receives the resource advertisement message from the offer BS and sends a resource renting request message based on the channel set information to the offer BS. The offer BS receives the resource renting request message from the renter BS and sends a response message for the resource renting request message to the renter BS. The renter BS receives the response message.

According to the present invention, in a CR wireless communication system, an offer BS broadcasts a resource advertisement message including channel set information to at least one neighbor BS, receives a resource renting request message in response to the resource advertisement message, and sends a response message for the resource renting request message. A renter BS being one of the at least one neighbor BS, receives the resource advertisement message from the offer BS, sends the resource renting request message to an offer BS based on the channel set information, and receives the response message for the resource renting request message from the offer BS.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail for the sake of clarity and conciseness.

The terms used herein will first be defined as follows.

Offer BS: a BS that rents radio resources to another BS.

Renter BS: a BS that borrows radio resources from another BS.

Base Station (BS) Communication Subchannel: a subchannel on which the renter BS requests allocation of uplink resources (or channel) to send a dynamic Resource Rending Request message or the offer BS requests allocation of uplink resources to send an ACK signal.

System Information area: a downlink period for which the offer BS advertises extra resources, i.e. candidate resources or sends a message to a neighbor BS.

Resource Advertisement (RA): a message by which the offer BS broadcasts resource information.

Resource Renting Request (RR-REQ): a message by which the renter BS requests resource renting to the offer BS.

Resource Renting Response (RR-RSP): a response message for RR-REQ.

Resource Renting Acknowledgement (RR-ACK): an ACK message for RR-RSP.

Resource Collecting Request (RC-REQ): a message by which the offer BS requests resource collection from the renter BS.

Resource Collecting Response (RC-RSP): a response message for RC-REQ.

Resource Collecting Response Acknowledgement (RC-RSPACK): an ACK message for RC-RSP.

Resource Collecting Acknowledgement (RC-ACK): an ACK message for RC-RSPACK.

Resource Returning Request (RRET-REQ): a message by which the renter BS requests resource return to the offer BS.

Resource Returning Response (RRET-RSP): a response message for RRET-REQ.

Resource Returning Acknowledgement (RRET-ACK): an ACK message for RRET-RSP.

To provide a resource rental function between CR BSs in a CR environment, the present invention considers the following:

(1) CR shares frequency resources unused for BSs in communication systems where frequency resources are allocated on a service provider basis, such as portable Internet, Code Division Multiple Access (CDMA) network and wireless Internet. A proportion of a shared frequency band available to each service provider is decided by an agreement between service providers or according to government policy. Therefore, each BS should be able to rent the remainder of acquired resources for efficient use of the shared frequency resources.

(2) For the CR technology, a specific channel should be defined for exchanging control information between BSs, or a method of exchanging information between them without using a control channel should be specified. Thus, BSs should be able to send control messages in synchronization to at least one downlink/uplink or channel, for exchanging control information in the case of no specific control channel.

The present invention provides a resource management scheme in which a BS with candidate resources rents the resources to at least one neighbor BS so that the neighbor BSs can share resources with each other. For this purpose, the following description is made of a resource renting procedure between an offer BS and a renter BS and a rented resource releasing procedure. The rented resource releasing procedure will be described separately as a resource collecting procedure by the offer BS and a resource returning procedure by the renter BS.

In a CR system, a BS mainly provides a resource renting functionality. According to the present invention, BSs competing for and share radio resources at a ratio specified by policy or an agreement between service providers. If a BS has excessive or deficient radio resources, a dynamic resource renting procedure is triggered by request from a neighbor BS, which can be a BS under an identical or different service provider. The dynamic resource renting procedure involves the use of a specific control channel preset between the two BSs. If there is no specific control channel, each of the BSs should be synchronized to at least one downlink/uplink channel of an adjacent BS under another service provider to exchange control information for resource renting without any specific channel.

Figure 2:
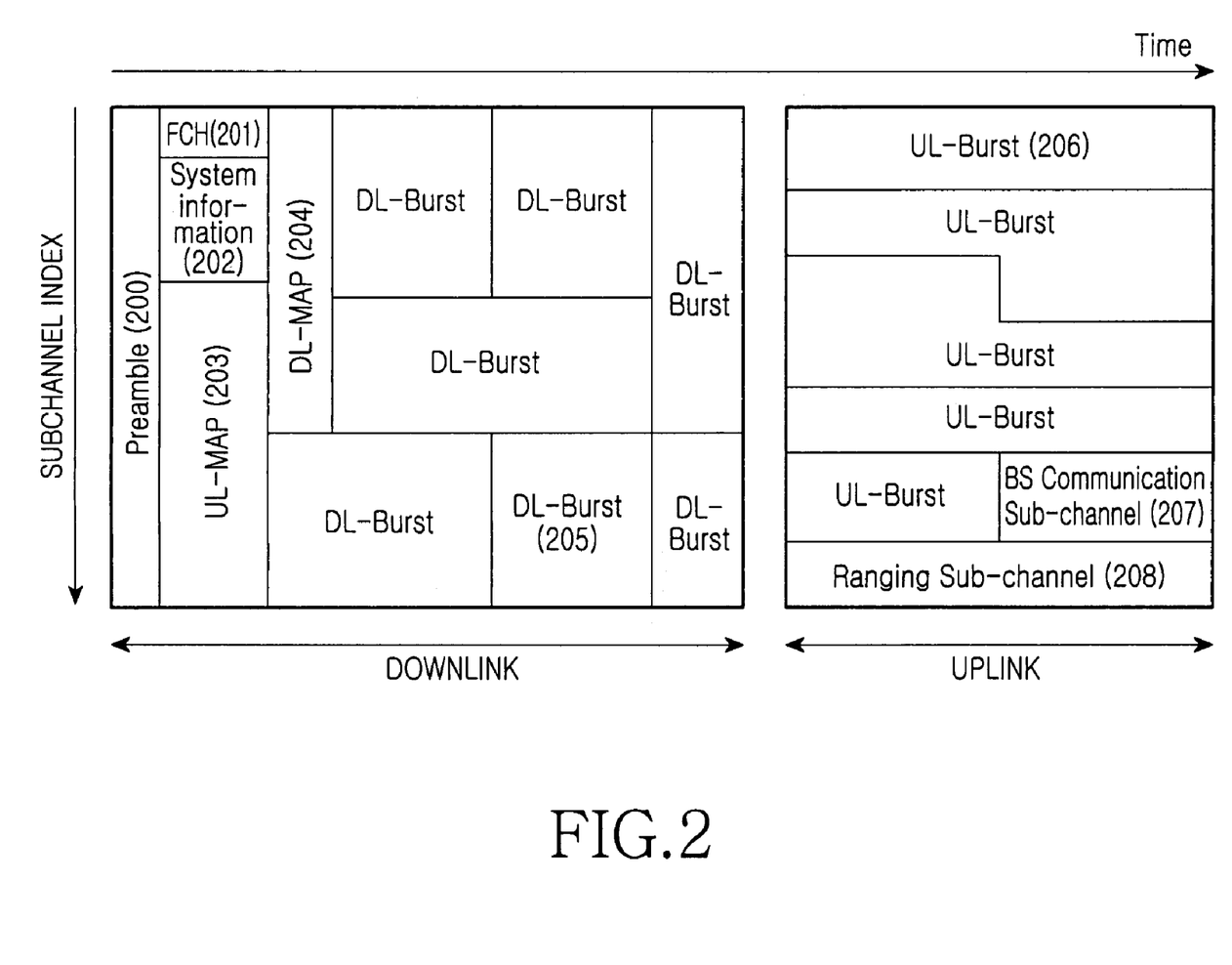
FIG. 2 illustrates the structure of an Orthogonal Frequency Division Multiple Access (OFDMA) frame for use in the CR system according to the present invention.

FIG. 2 illustrates an preferred control message transmission/reception for implementation of the present invention, particularly an OFDMA frame structure.

Referring to FIG. 2, an OFDMA frame is divided into a downlink period and an uplink period.

The downlink period includes a Preamble field 200, a Frame Check Header (FCH) field 201, a System Information field 202, an UpLink-MAP (UL-MAP) field 203, a DownLink-MAP (DL-MAP) field 204 and a DownLink Burst (DL-Burst) field 205.

The System Information field 202 carries a control message advertisement about candidate radio resources. The DL-MAP field 203 provides information about resources allocated to the downlink for each MS within the OFDMA frame, and the UL-MAP field 204 provides information about resources allocated to the uplink for each MS within the OFDMA frame. The DL-Burst field 205 delivers actual data for each MS.

The uplink period includes a UL-Burst field 206, a BS Communication Subchannel field 207 and a Ranging Subchannel field 208.

The UL-Burst field 206 carries actual data from each MS. The BS Communication Subchannel field 207 carries a request for allocation of uplink radio resources by which a BS will send an RR-REQ message requesting radio resource renting to a neighbor BS. The Ranging Subchannel field 208 is used for initialization of MSs.

According to the present invention, the System Information field 202 is used as a downlink period for which a control message is sent to exchange candidate resource between neighbor BSs. The BS Communication Subchannel field 207 is a period for which uplink radio resources or an uplink channel is requested for a renter BS to send a dynamic resource renting request and for an offer BS to send an Acknowledgement (ACK) signal. The offer BS and the renter BS neighbor each other.

Figure 1:
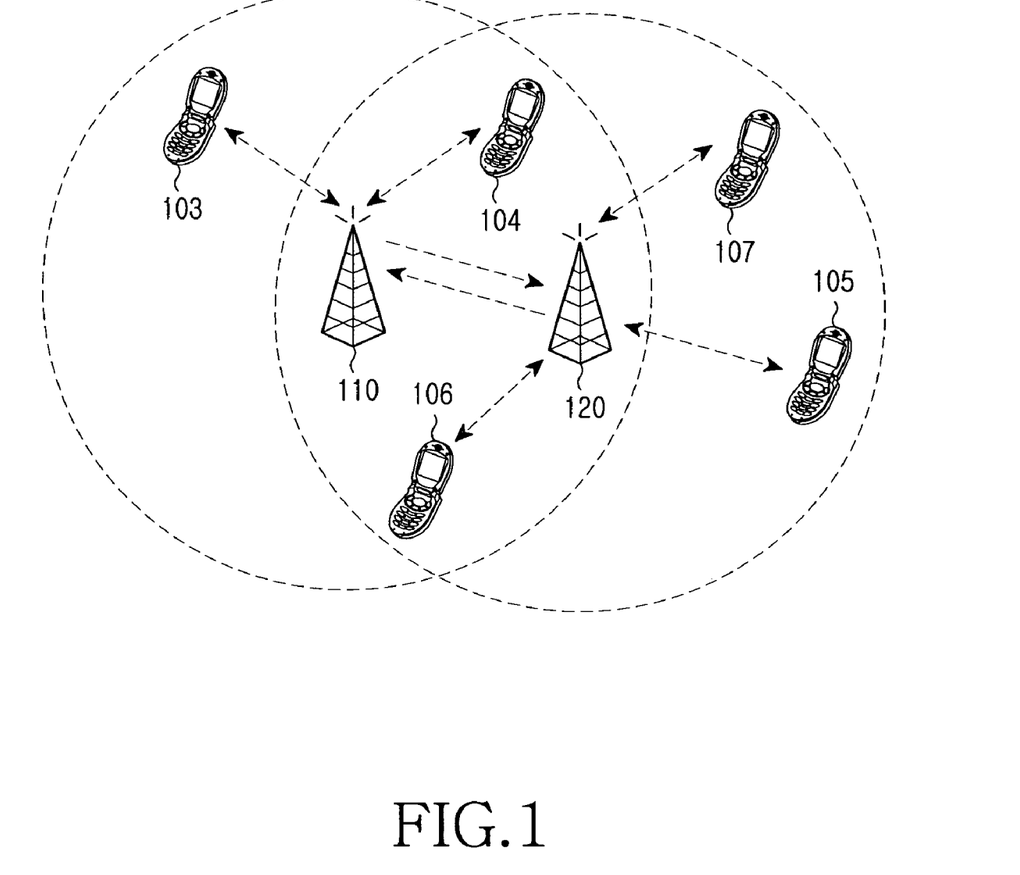
FIG. 1 illustrates a CR communication system to which a resource management method of the present invention is applied.

FIG. 1 illustrates a CR environment to which a radio resource renting method according to the present invention is applied. In FIG. 1, a first service provider network co-exists with a second service provider network.

Referring to FIG. 1, the service area of a first BS 110 under the first service provider is overlapped with that of a second BS 120 under the second service provider. The first BS 110 services MSs 103 and 104 within its service area, and the second BS 120 services MSs 105, 106 and 107 within its service area.

The MSs 103 to 107 can communicate with the first or second BS 110 or 120 using a different frequency band according to a communication environment. The first and second BSs 110 and 120 may exchange control information for sharing radio resources, i.e. renting radio resources. If a specific channel is defined between the BSs 110 and 120, then the control messages are sent on the specific channel. Without the specific channel, each of the BSs 110 and 120 sends a control message on the downlink or uplink of a channel that it has acquired.

A resource management method according to the present invention will be described below on the assumption that no specific channel is defined for exchanging control information.

1. Resource Renting Procedure

According to the present invention, a CR BS rents the remaining radio resources (i.e. candidate resources) from servicing users to at least one neighbor CR BS requiring resources. This radio resource rental promotes efficient sharing of radio resources. Messages exchanged between BSs to request radio resource rental and to accept the request in the radio resource renting procedure include a parameter for negotiating a rental period and a parameter indicating the amount of resources.

Figure 3:
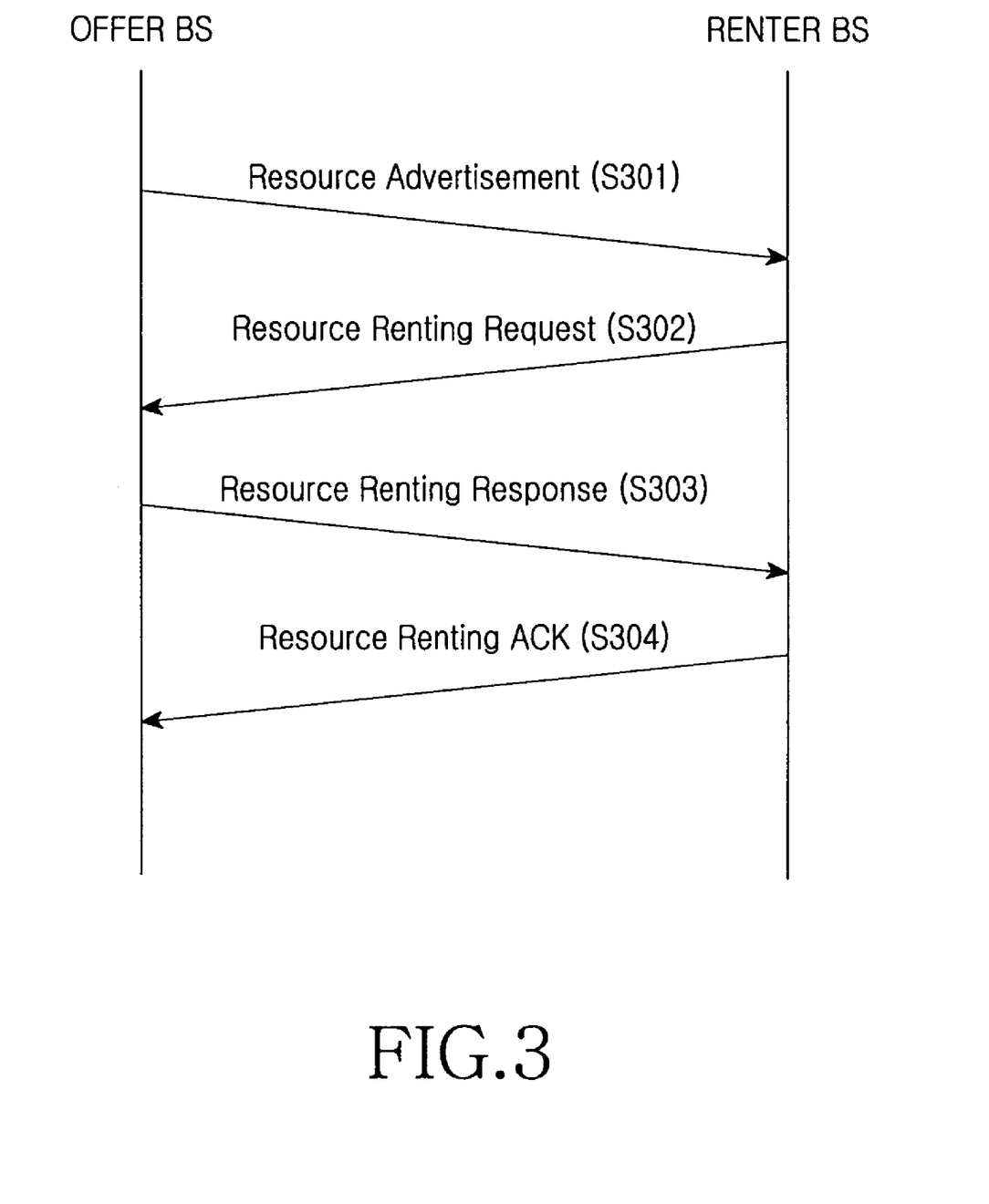
FIG. 3 is a diagram illustrating a signal flow for a resource renting procedure between CR BSs in the resource management method for the CR communication system according to the present invention.

FIG. 3 is a diagram illustrating a signal flow for a resource renting procedure between CR BSs in the resource management method for the CR communication system according to the present invention.

Referring to FIG. 3, an offer BS broadcasts an RA message including information about candidate radio resources in step S301. In OFDMA, the RA message is broadcast in the System Information field of an OFDMA frame.

A renter BS is synchronized to the downlink of the offer BS being one of its neighbor BSs and thus it can receive the RA message from the offer BS.

When the renter BS needs to rent radio resources from the offer BS, it sends an RR-REQ message to the offer BS using preliminarily allocated uplink radio resources in step S302. The requested radio resources for rental are chosen based on channel set information included in the RA message. The channel set information can be information about the candidate resources.

Upon receipt of the RR-REQ message, the offer BS determines whether to rent the radio resources to the renter BS. If the offer BS determines to rent, it sends an RRS-RSP message accepting the rental request in step S303. If the offer BS supports OFDMA, it sends the RR-RSP message in the System Information field of the OFDMA frame.

The renter BS monitors reception of the RR-RSP message from the offer BS. If the renter BS supports OFDMA, it monitors the System Information field of the OFDMA frame, for reception of the RR-RSP message.

Upon receipt of the RR-RSP message, the renter BS sends an RR-ACK message acknowledging the reception of the RR-RSP message to the offer BS in step S304.

The renter BS requires uplink radio resources in sending the RR-REQ message or the RR-ACK message to the offer BS. Therefore, the renter BS performs an uplink radio resource allocation procedure before the transmission of the RR-REQ or RRR-ACK message.

More specifically, the renter BS requests allocation of uplink radio resources to the offer BS, before sending the RR-REQ message or the RR-ACK message. The request is content-based or made by a unique code. In OFDMA, the renter BS requests the uplink radio resource allocation in the BS Communication Subchannel field of an OFDMA frame.

The offer BS then allocates available uplink radio resources to the renter BS and sends information about the allocated uplink radio resources to the renter BS. In OFDMA, the offer BS sends the uplink radio resource allocation information in the UL-MAP field of an OFDMA frame.

The renter BS receives the uplink radio resource allocation information from the offer BS. In OFDMA, the renter BS can determine whether uplink radio resources have been allocated to it from the UL-MAP field of an OFDMA frame following the OFDMA frame in which it requested the uplink radio resource allocation. Later, the renter BS sends the RR-REQ message or the RR-ACK message using the uplink radio resources indicated by the uplink radio resource allocation information. For the transmission of the RR-ACK message, the renter BS may use the uplink radio resources allocated for the RR-REQ message or may be allocated new uplink radio resources.

Figure 4:
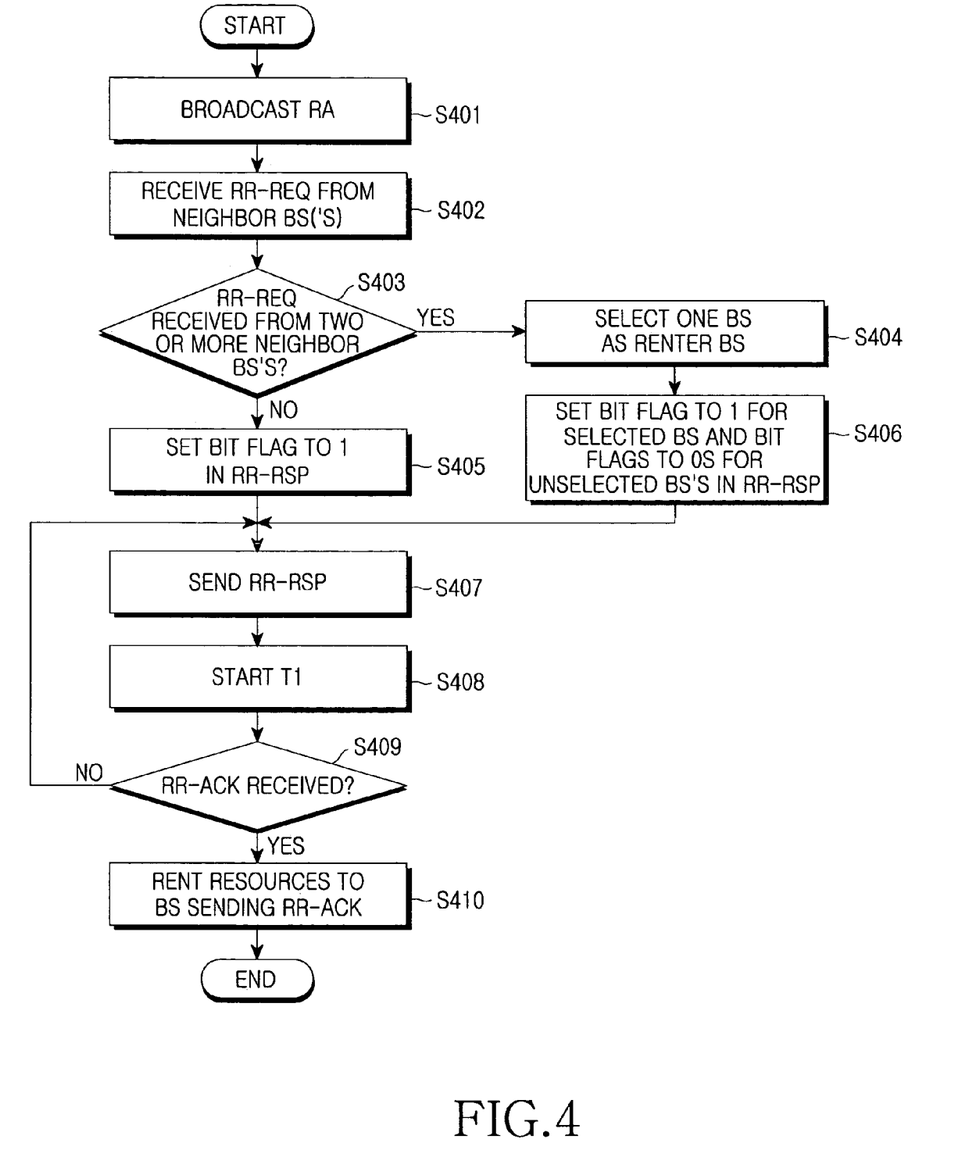
FIG. 4 is a flowchart illustrating a resource renting operation in an offer BS in the resource management method for the CR communication system according to the present invention.

FIG. 4 is a flowchart illustrating a resource renting operation in the offer BS in the resource management method for the CR communication system according to the present invention.

Referring to FIG. 4, the offer BS broadcasts an RA message including channel set information, i.e. information about candidate resources in step S401 and receives an RR-REQ message in response to the RA message from at least one neighbor BS in step S402. In step S403, the offer BS determines whether RR-REQ messages have been received from two or more neighbor BSs.

If the offer BS has received an RR-REQ message from one neighbor BS, it sets a rental availability bit flag corresponding to the neighbor BS to '1' among a plurality of rental availability bit flags in an RR-RSP message in step S405.

However, if the offer BS has received RR-REQ messages from two or more neighbor BSs, it selects at least one of the neighbor BSs to which radio resources will be rented in step S404. An algorithm for selecting the neighbor BS for radio resource rental can be predefined. In step S406, the offer BS sets a rental availability bit flag corresponding to the at least one selected neighbor BS to '1' in the RR-RSP message, while setting rental availability bit flags corresponding to unselected BSs to '0s'.

Thus, if a rental availability bit flag in the RR-RSP message is 1, this implies that the resource rental request is accepted. If the rental availability bit flag is 0, this implies that the resource rental request is rejected.

The offer BS sends the RR-RSP message to the renter BS in step S407 and activates a timer Ti in step S408. The timer T1 is set to a time period for which the offer BS is to await reception of an RR-ACK message for the RR-RSP message. In step S409, the offer BS determines whether the RR-ACK message has been received from the renter BS before expiration of the timer T1. The renter BS is the BS for which a rental availability bit flag was set to 1.

If there is any BS from which the offer BS fails to receive the RR-ACK message before the timer expiration, the offer BS retransmits the RR-RSP message to the BS on its downlink in step S407. The RR-RSP message can be retransmitted a set number of times.

Upon receipt of an RR-ACK message from every BS requesting the resource rental, the offer BS rents resources to at least one renter BS that has sent the RR-ACK message by selecting radio resources from candidate resources in step S410.

Figure 5:
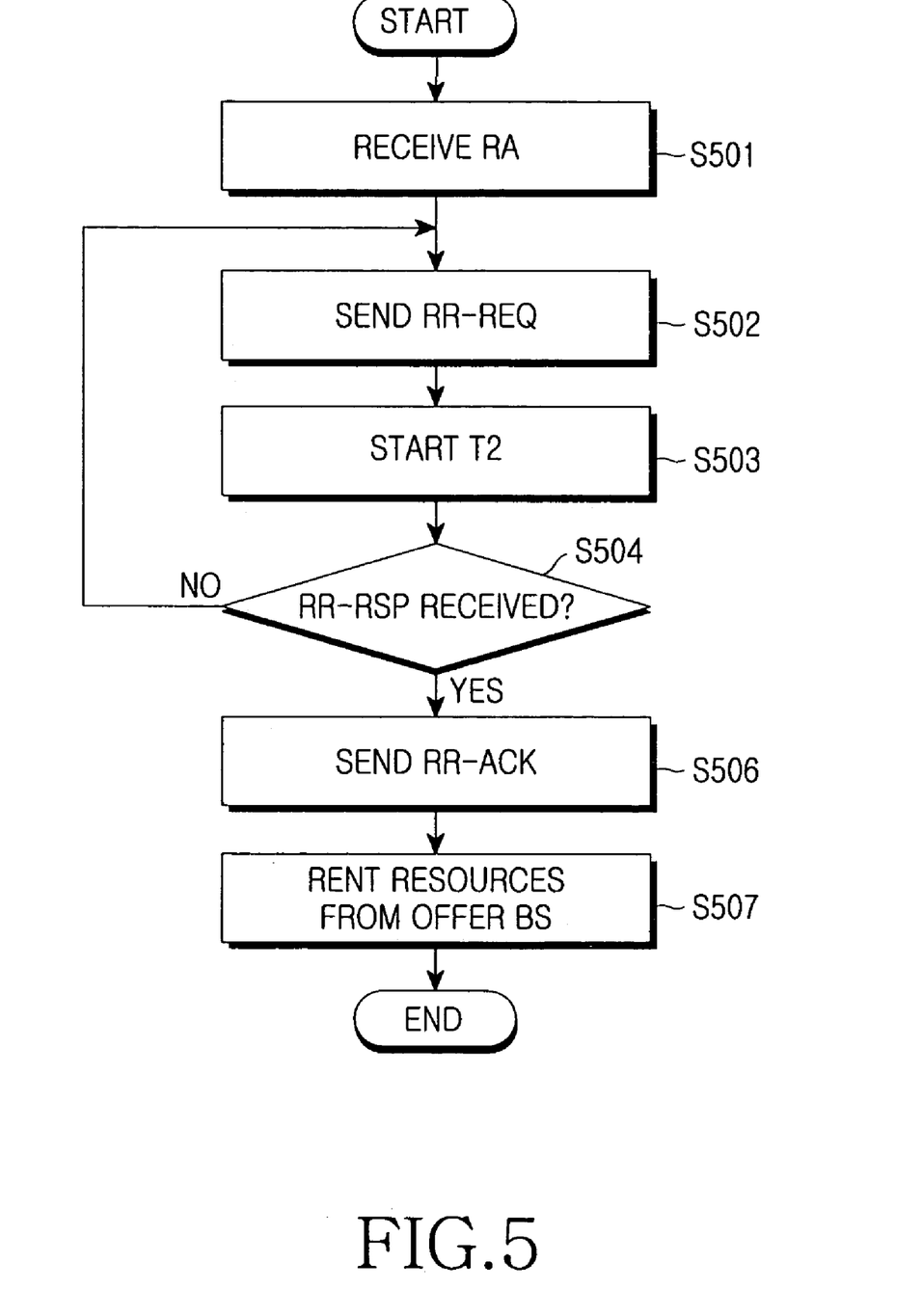
FIG. 5 is a flowchart illustrating a resource renting operation in a renter BS in the resource management method for the CR communication system according to the present invention.

FIG. 5 is a flowchart illustrating a resource renting operation in the renter BS in the resource management method for the CR communication system according to the present invention.

Referring to FIG. 5, the renter BS receives an RA message broadcast from at least one neighbor BS in step S501. When necessary, the renter BS sends an RR-REQ message to the neighbor BS, requesting resource rental in step S502. The uplink on which the RR-REQ message is delivered has been allocated by the neighbor BS that sent the RA message. The renter BS then activates a timer T2. In step S504, the renter BS monitors reception of an RR-RSP message from the at least one neighbor BS until the timer T2 expires.

If the renter BS fails to receive the RR-RSP message before the timer T2 expires, it retransmits the RR-REQ message in step S502. However, if the renter BS receives the RR-RSP message before the timer expiration, it sends an RR-ACK message to the offer BS that sent the RR-RSP message in step S506. The uplink carrying the RR-ACK message has been allocated by the offer BS. In step S507, the renter BS uses resources rented by the offer BS as available resources.

2. Resource Collecting Procedure

The resource collecting procedure in the resource management method of the present invention is a process of collecting rented resources from the renter BS by the offer BS, when needed. This procedure provides flexibility to resource rental. A resource rental period can be decided in the resource renting procedure, for resource collection. Even before the resource rental period expires, the offer BS can collect the rented resources.

Figure 6:
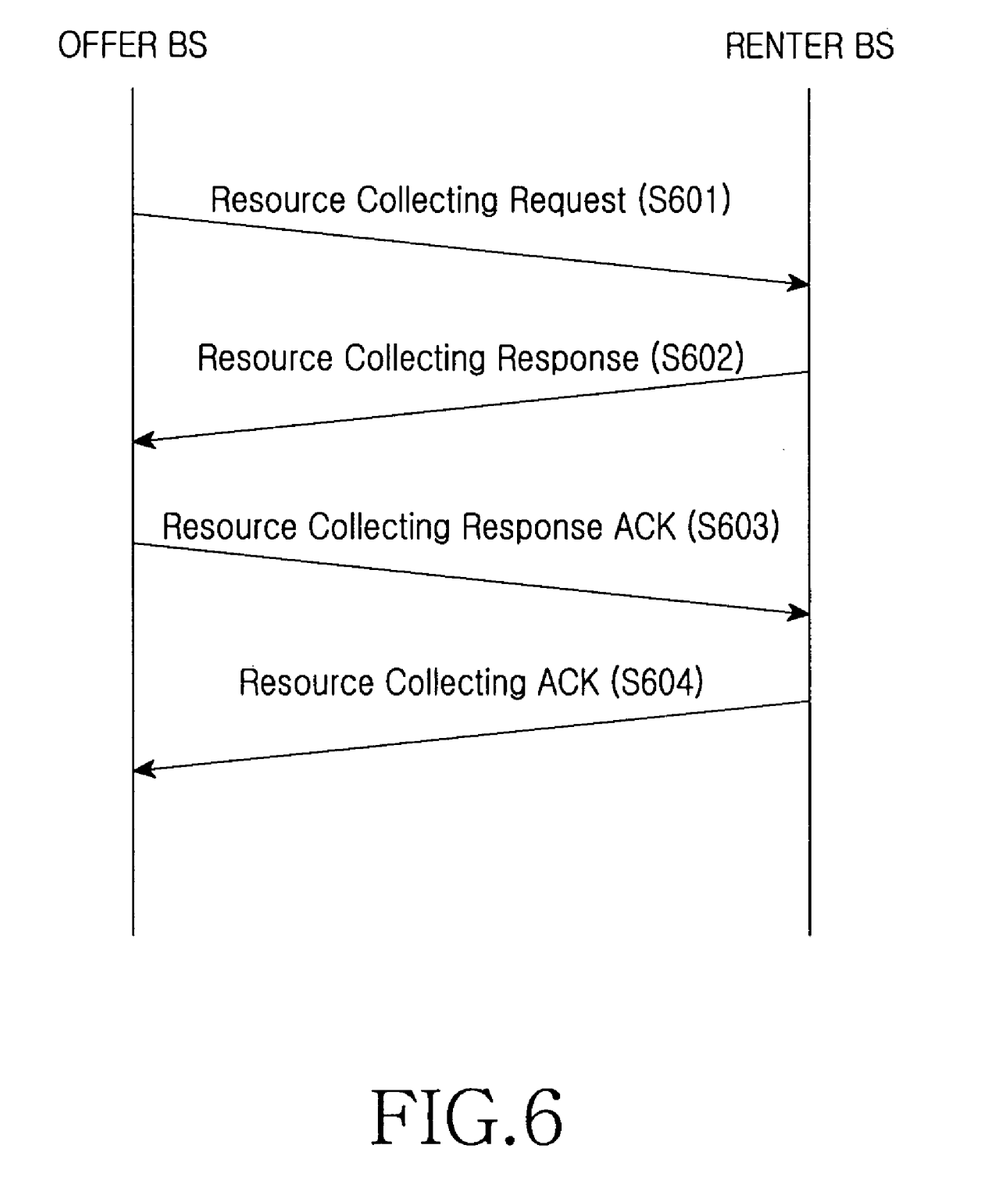
FIG. 6 is a diagram illustrating a signal flow for a resource collecting procedure in the resource management method for the CR communication system according to the present invention.

FIG. 6 is a diagram illustrating a signal flow for a resource collecting procedure in the resource management method for the CR communication system according to the present invention.

Referring to FIG. 6, when it is necessary to collect rented resources due to an environmental change such as an increase in traffic within the system, the offer BS sends an RC-REQ message to the renter BS in step S601. In step S602, the renter BS replies with an RC-RSP message.

Upon receipt of the RC-RSP message, the offer BS sends an RC-RSPACK message to the renter BS in step S603 and the renter BS replies with an RC-ACK message in step S604. In this manner, the resource collecting procedure is completed.

Figure 7:
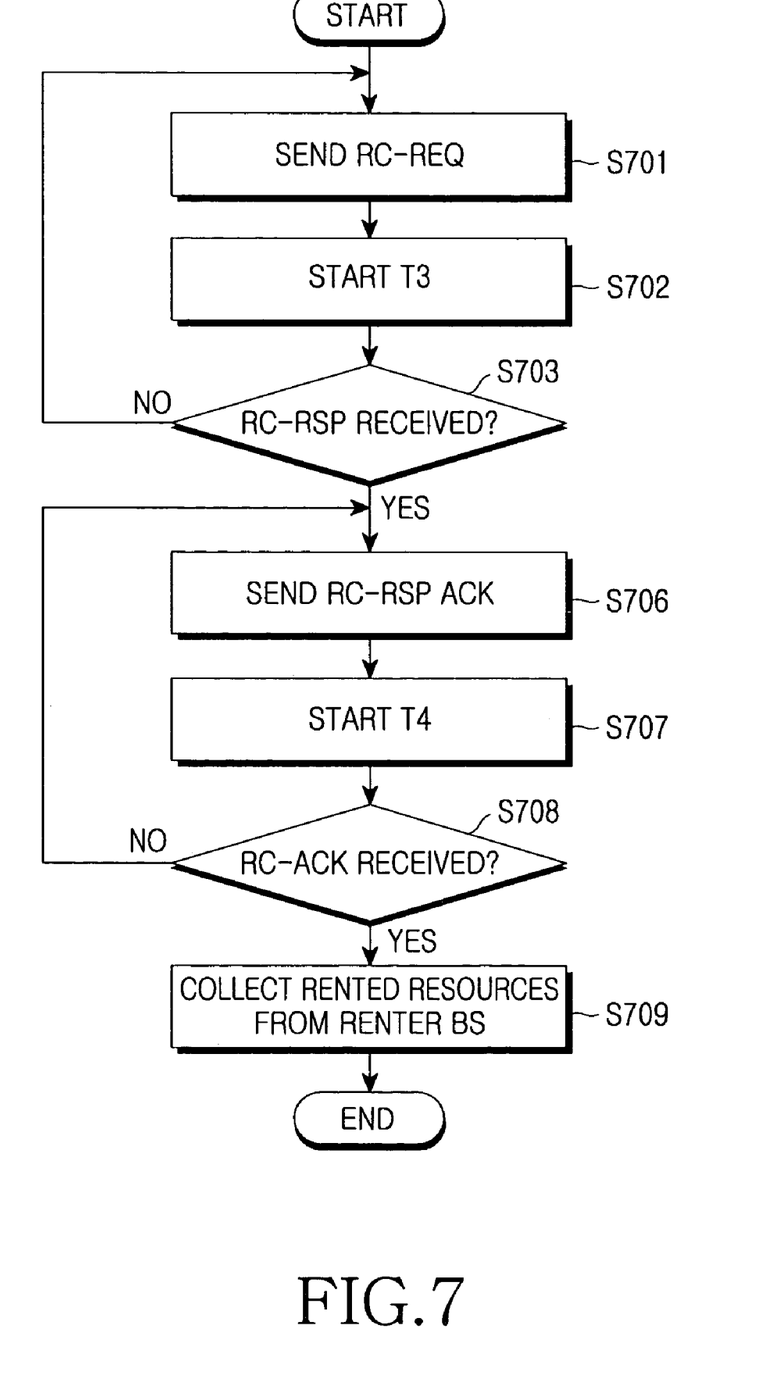
FIG. 7 is a flowchart illustrating a resource collecting operation in the offer BS in the resource management method for the CR communication system according to the present invention.

FIG. 7 is a flowchart illustrating a control operation for collecting resources in the offer BS according to the present invention.

Referring to FIG. 7, the offer BS sends an RC-REQ message including information about resources to be collected to the renter BS in step S701. The uplink on which the RC-REQ message is delivered has been allocated by the renter BS. The offer BS activates a timer T3 in step S702 and monitors reception of an RC-RSP message from the renter BS before the timer T3 expires in step S703.

If the offer BS fails to receive the RC-RSP message before the timer expiration, it retransmits the RC-REQ message in step S701. The RC-REQ message can be retransmitted a set number of times. However, upon receipt of the RC-RSP message before the timer expiration, the offer BS replies to the renter BS with an RC-RSPACK message in step S706. The uplink on which the RC-RSPACK message is delivered has been allocated by the renter BS. In step S707, the offer BS activates a timer T4. The offer BS monitors reception of an RC-ACK message for the RC-RSPACK message before the timer T4 expires in step S708. The RC-ACK message is sent on the uplink of the renter BS.

If the offer BS fails to receive the RC-ACK message before the timer expiration, it retransmits the RC-RSPACK message in step S706. However, upon receipt of the RC-RSPACK message before the timer expiration, the offer BS collects the rented resources from the renter BS in step S709 and then ends the resource collecting procedure.

Figure 8:
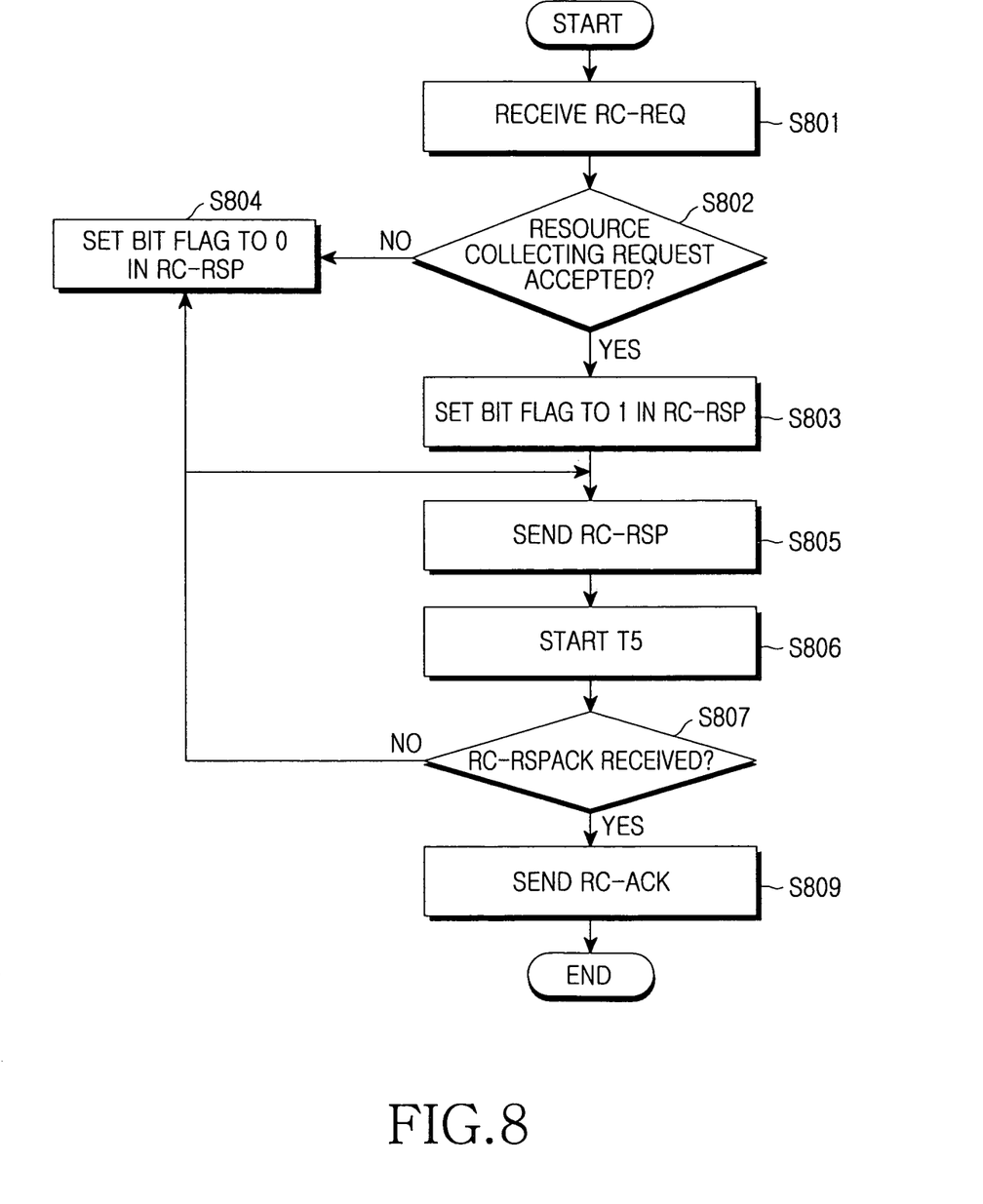
FIG. 8 is a flowchart illustrating a resource collecting operation in the renter BS in the resource management method for the CR communication system according to the present invention.

FIG. 8 is a flowchart illustrating a control operation of the renter BS in the resource collecting procedure according to the present invention.

Referring to FIG. 8, the renter BS receives an RC-REQ message from the offer BS in step S801 and decides whether to accept the resource collecting request in step S802. The decision is made considering current user traffic and by determining whether resources allocated to a user were rented.

If the renter BS decides to accept the resource collecting request, it sets a bit flag to '1' in an RC-RSP message in step S803. If the renter BS decides to reject the resource collecting request, it sets the bit flag to '0' in the RC-RSP message in step S804.

In step S805, the renter BS sends the RS-RSP message with the bit flag to the offer BS. The RC-RSP message can be delivered using downlink resources allocated by the offer BS. After sending the RS-RSP message, the renter BS activates a timer T5 in step S806 and monitors reception of an RC-RSPACK message from the offer BS before the timer T5 expires in step S807.

If the renter BS fails to receive the RC-RSPACK message before the timer expiration, it retransmits the RC-RSP message in step S805. However, upon receipt of the RC-RSPACK message before the timer expiration, the renter BS replies with an RC-ACK message in step S809. The RC-ACK message can be sent on the downlink of the renter BS.

3. Resource Returning Procedure

The resource returning procedure in the resource management method of the present invention is a process of returning rented radio resources to the offer BS after using them for a rental period by the renter BS. The rental period can be decided in the resource renting procedure. Even when the rental period is active, the offer BS can collect the resources.

Figure 9:
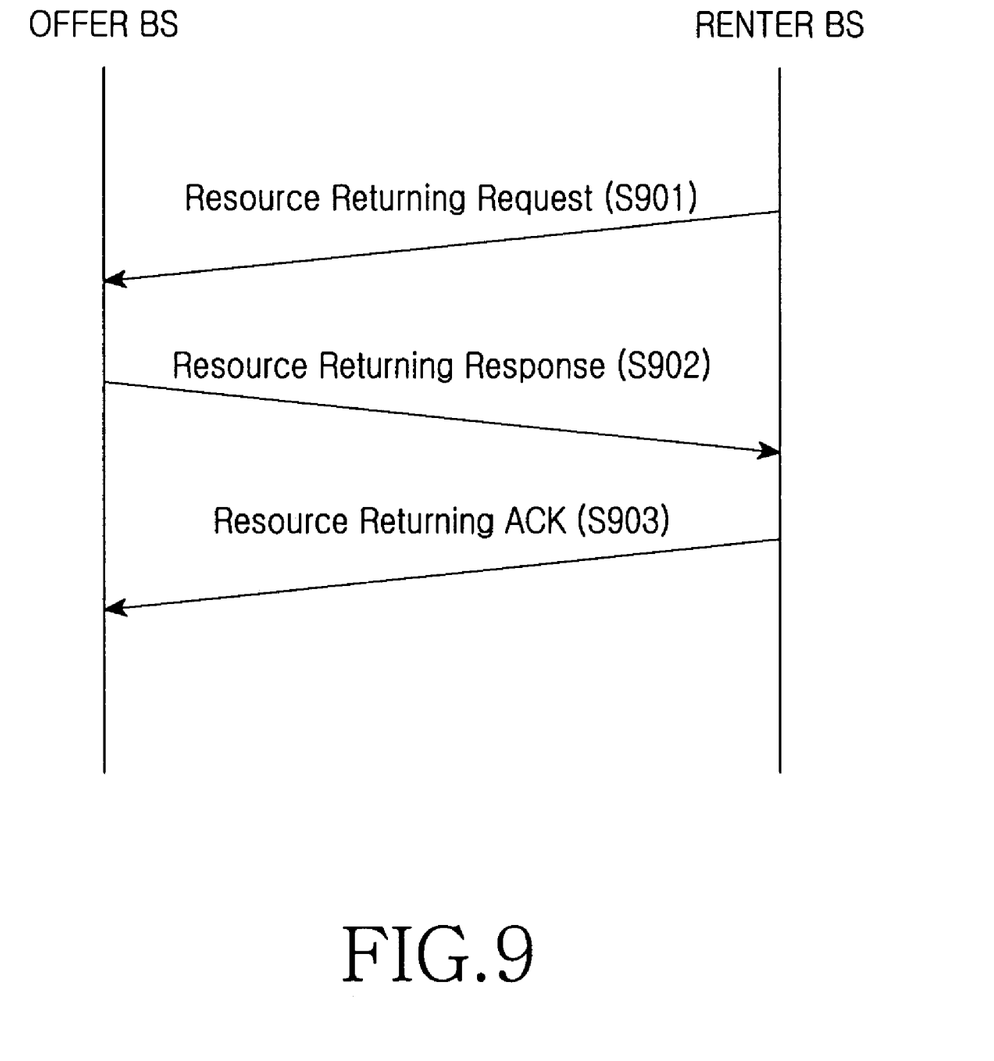
FIG. 9 is a diagram illustrating a signal flow for a resource returning procedure in the resource management method for the CR communication system according to the present invention.

FIG. 9 is a diagram illustrating a signal flow for a resource returning procedure in the resource management method for the CR communication system according to the present invention.

Referring to FIG. 9, the renter BS monitors whether resources rented from the offer BS need to be returned due to a change in radio communication environment such as a decrease in traffic in the system or expiration of a resource rental period. If it decides to return the rented resources, the renter BS sends an RRET-REQ message to the offer BS in step S901.

Upon receipt of the RRET-REQ message, the offer BS replies with an RRET-RSP message in step S902. In step S903, the renter BS sends an RRET-ACK message. In this manner, the resource returning procedure is completed.

Figure 10:
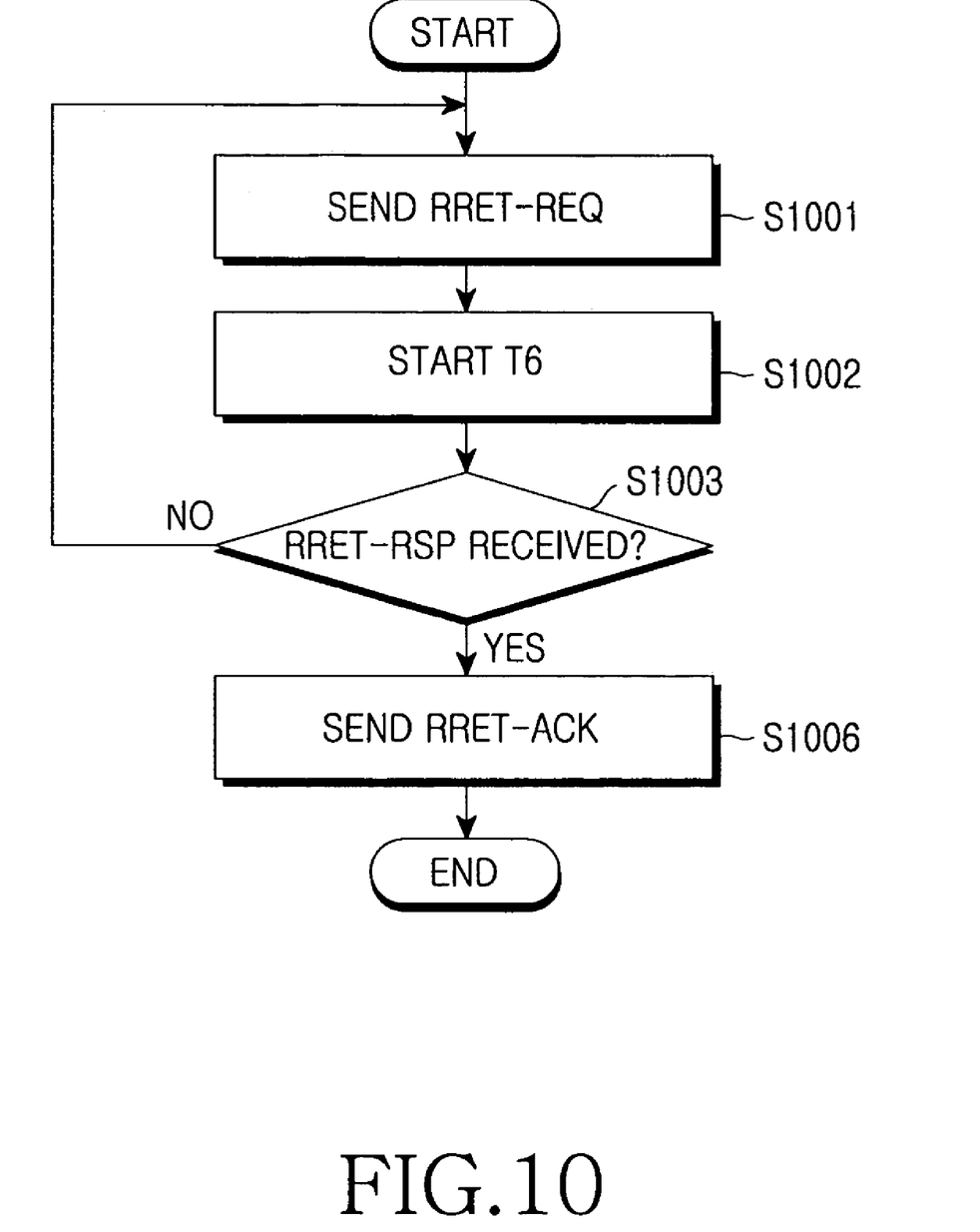
FIG. 10 is a flowchart illustrating a resource returning operation in the offer BS in the resource management method for the CR communication system according to the present invention.

FIG. 10 is a flowchart illustrating a control operation of the renter BS for returning resources according to the present invention.

Referring to FIG. 10, when it decides to return rented resources, the renter BS sends an RRET-REQ message including information about the resources to be returned to the offer BS in step S1001. The resource returning may take place when a preset resource rental period has elapsed or a radio communication environment has changed (e.g., a decrease in traffic). The RRET-REQ message can be delivered on the uplink of the offer BS.

The renter BS activates a timer T6 in step S1002 and monitors reception of an RRET-RSP message in response to the RRET-REQ message from the offer BS before the timer T6 expires in step S1003. The RRET-RSP message can be received on the downlink of the offer BS.

If the renter BS fails to receive the RRET-RSP message before the timer expiration, it retransmits the RRET-REQ message in step S1001. However, upon receipt of the RRET-RSP message before the timer expiration, the renter BS sends an RRET-ACK message to the offer BS in step S1006. The RRET-ACK message can be sent on the uplink of the offer BS.

Figure 11:
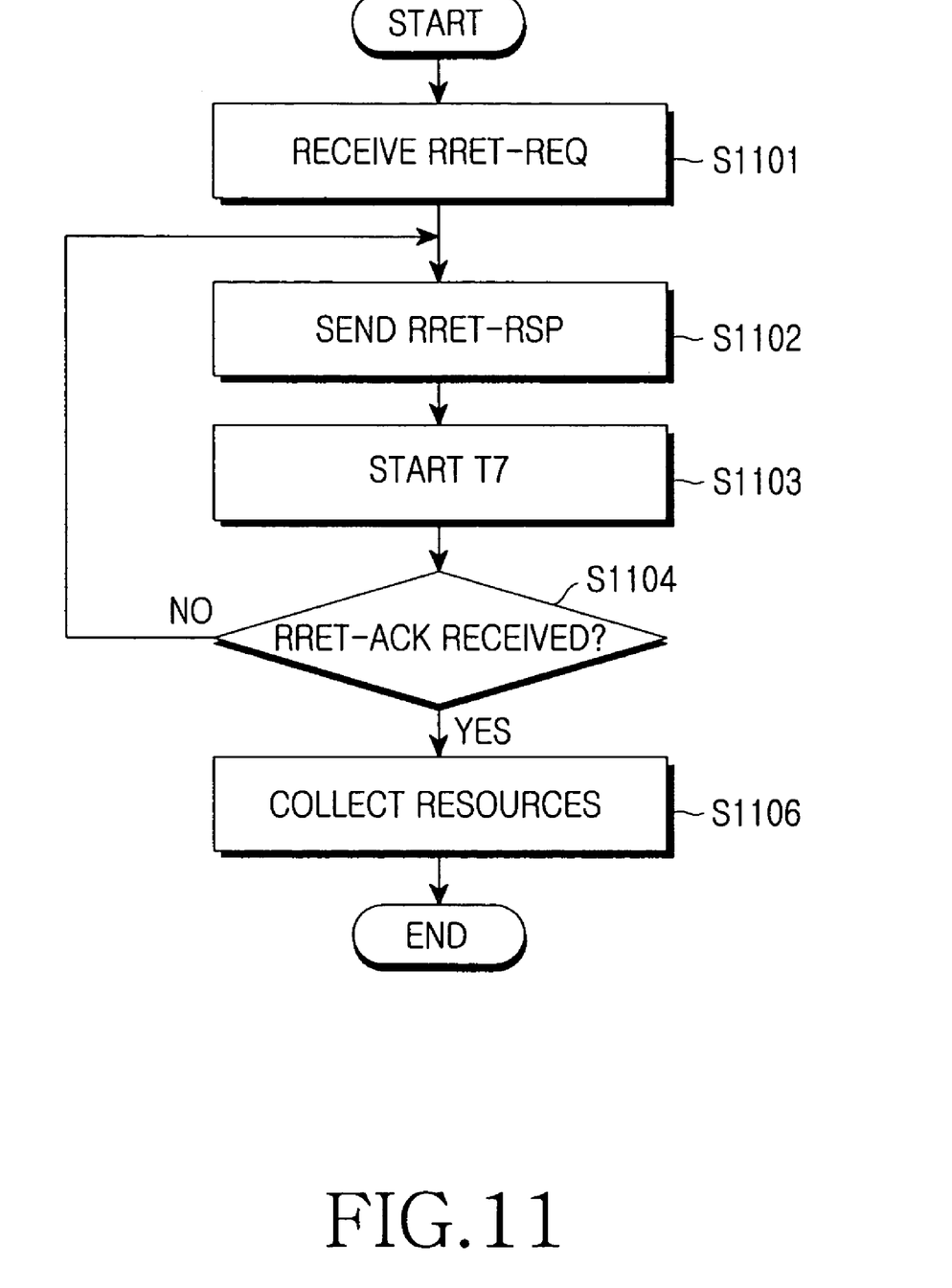
FIG. 11 is a flowchart illustrating a resource returning operation in the renter BS in the resource management method for the CR communication system according to the present invention.

FIG. 11 is a flowchart illustrating a control operation of the offer BS in the resource returning procedure according to the present invention. Referring to FIG. 11, the offer BS receives an RRET-REQ message from the renter BS on the uplink in step S1101 and replies with an RRET-RSP message on the downlink of the offer BS in step S1102. In step S1103, the offer BS activates a timer T7.

The offer BS monitors reception of an RRET-ACK message from the renter BS before the timer T7 expires in step S1104. If the offer BS fails to receive the RRET-ACK message before the timer expiration, it retransmits the RRET-RSP message in step S1102. However, upon receipt of the RRET-ACK message before the timer expiration, it collects rented resources from the renter BS in step S1106. Thus, the resource returning procedure is completed.

While the resource management method for a CR communication system has been described in the context of OFDMA, the present invention is not limited to OFDMA. The present invention is applicable to any system based on a physical layer such as Code Division Multiple Access (CDMA), Time Division Multiple Access (TDMA) and Frequency Division Multiple Access (FDMA). In this case, the System Information and the BS Communication Subchannel can be included in uplink/downlink control information or a specific control channel defined between BSs.

In accordance with the present invention as described above, shared radio resources can be dynamically rented between CR BSs. Therefore, the utilization rate of limited radio resources can be maximized.

When a BS of a service provider requires more shared radio resources than allocated due to an increase in user traffic such as multimedia traffic with data, audio and video, the present invention enables the BS to rent resources from a neighbor BS having candidate resources. As a consequence, Quality of Service (QoS) of users is maintained.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of renting resources in a Cognitive Radio (CR) wireless communication system, comprising the steps of:
   receiving, by a renter Base Station (BS), a resource advertisement message broadcast from a plurality of neighbor BSs;
   requesting, by the renter BS, allocation of uplink radio resources to an offer BS being one among the neighbor BSs when a specific channel is not between the offer BS and the renter BS;
   transmitting, by the renter BS, a resource renting request message through the uplink radio resources to the offer BS based on information of candidate resources unused for the neighbor BSs included in the resource advertisement message; and
   receiving, by the renter BS, a response message for the resource renting request message from the offer BS and renting the candidate resources from the offer BS,
   wherein the candidate resources are remaining resources from servicing the neighbor BSs,
   the resource renting request message includes information about resources to be rented, which resources are selected based on the information of the candidate resources and information about a resource rental period,
   the selected resources are rented, by the renter BS, from the offer BS during the resource rental period,
   the allocation of uplink radio resources is content-based, and
   the resource advertisement message is broadcast in the System Information field of an OFDMA (Orthogonal Frequency Division Multiplexing Access) frame.

2. The method of claim 1, further comprising returning the rented resources to the offer BS by the renter BS, when the resource rental period has elapsed.

3. The method of claim 2, further comprising returning the rented resources to the offer BS by the renter BS, when the offer BS requests returning of the rented resources.

4. A method of renting resources in a Cognitive Radio (CR) wireless communication system, comprising the steps of:
   broadcasting, by an offer Base Station (BS), a resource advertisement message including information of candidate resources unused for the offer BS to a plurality of neighbor BSs;

receiving, by the offer BS, an allocation request of uplink radio resources from a renter BS being one among the neighbor BSs when a specific channel is not between the offer BS and the renter BS;

receiving, by the offer BS, a resource renting request message through the uplink radio resources from the renter; and transmitting, by the offer BS, a response message for the resource renting request message to the renter BS and renting the candidate resources to the renter BS, wherein the candidate resources are remaining resources from servicing the neighbor BSs, the resource renting request message includes information about resources to be rented, which resources are selected based on the information of the candidate resources and information about a resource rental period, the selected resources are rented, by the renter BS, from the offer BS during the resource rental period, the allocation request of uplink radio resources is content-based, and the resource advertisement message is broadcast in the System Information field of an OFDMA(Orthogonal Frequency Division Multiplexing Access) frame.

5. The method of claim 4, further comprising collecting the rented resources from the renter BS by the offer BS, when the resource rental period has elapsed.

6. The method of claim 5, further comprising requesting, by the offer BS, a return of the rented resources to the renter BS, when the offer BS needs to collect the rented resources.

7. A method of renting resources in a Cognitive Radio (CR) wireless communication system, comprising the steps of:

broadcasting, by an offer Base Station (BS), a resource advertisement message including information of candidate resources unused for the offer BS to a plurality of neighbor BSs;

receiving, by a renter BS being one among the neighbor BSs, the resource advertisement message from the offer BS, requesting, by the renter BS, allocation of uplink radio resources to the offer BS when a specific channel is not between the offer BS and the renter BS and transmitting, by the renter BS, a resource renting request message through the uplink radio resources based on the information of candidate resources to the offer BS;

receiving, by the offer BS, the resource renting request message from the renter BS, transmitting, by the offer BS, a response message for the resource renting request message to the renter BS and renting, by the offer BS, the candidate resources to the renter BS; and receiving, by the renter BS, the response message and renting, by the renter BS, the candidate resources from the offer BS, wherein the candidate resources are remaining resources from servicing the neighbor BSs, the resource renting request message includes information about resources to be rented, which resources are selected based on the information of the candidate resources and information about a resource rental period, the selected resources are rented, by the renter BS, from the offer BS during the resource rental period, the allocation of uplink radio resources is content-based, and the resource advertisement message is broadcast in the System Information field of an OFDMA(Orthogonal Frequency Division Multiplexing Access) frame.

8. The method of claim 7, further comprising returning the rented resources to the offer BS by the renter BS, when the resource rental period has elapsed.

9. The method of claim 8, further comprising:

requesting the return of the rented resources to the renter BS by the offer BS, when the offer BS needs to collect the rented resources; and returning the rented resources in response to the request of the offer BS by the renter BS.

10. A Cognitive Radio (CR) wireless communication system, comprising:

an offer Base Station (BS) for broadcasting a resource advertisement message including information of candidate resources unused for the offer BS to a plurality of neighbor BSs, receiving a resource renting request message in response to the resource advertisement message, transmitting a response message for the resource renting request message and renting the candidate resources; and a renter BS being one among the neighbor BSs, for receiving the resource advertisement message from the offer BS, requesting allocation of uplink radio resources to the offer BS when a specific channel is not between the offer BS and the renter BS, transmitting the resource renting request message through the uplink radio resources to an offer BS based on the information of candidate resources, receiving the response message for the resource renting request message from the offer BS and renting the candidate resources from the offer BS, wherein the candidate resources are remaining resources from servicing the neighbor BSs, the resource renting request message includes information about resources to be rented, which resources are selected based on the information of the candidate resources and information about a resource rental period, the renter BS rents the selected resources from the offer BS during the resource rental period, the allocation of uplink radio resources is content-based, and the offer BS broadcast the resource advertisement message in the System Information field of an OFDMA(Orthogonal Frequency Division Multiplexing Access) frame.

11. The system of claim 10, wherein the renter BS returns the rented resources to the offer BS, when the resource rental period has elapsed.

12. The system of claim 10, wherein the offer BS requests a return of the rented resources to the renter BS, when the offer BS needs to collect the rented resources.

13. The system of claim 12, wherein the renter BS returns the rented resources in response to the request of the offer BS.

14. The method of claim 1, wherein the response message is received in the System Information field of an OFDMA (Orthogonal Frequency Division Multiplexing Access) frame.

15. The method of claim 4, wherein the response message is transmitted in the System Information field of an OFDMA (Orthogonal Frequency Division Multiplexing Access) frame.

16. The method of claim 7, wherein the response message is transmitted in the System Information field of an OFDMA (Orthogonal Frequency Division Multiplexing Access) frame.

17. The method of claim 10, wherein the offer BS transmits the response message in the System Information field of an OFDMA (Orthogonal Frequency Division Multiplexing Access) frame.

* * * * *